United States Patent
Numano et al.

(10) Patent No.: US 6,744,623 B2
(45) Date of Patent: Jun. 1, 2004

(54) ELECTRONIC APPARATUS HAVING SUB DISPLAY UNIT WITH ADJUSTABLE INCLINATION ANGLE

(75) Inventors: Fujihito Numano, Hamura (JP); Yuuki Saikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/236,122

(22) Filed: Sep. 6, 2002

(65) Prior Publication Data

US 2003/0105892 A1 Jun. 5, 2003

(30) Foreign Application Priority Data

Nov. 30, 2001 (JP) ........................................ 2001-367247

(51) Int. Cl.[7] ................................................ G06F 1/16
(52) U.S. Cl. .......................... 361/681; 682/683; 345/87
(58) Field of Search .............................. 361/680–683; 248/917–924; 345/87, 905

(56) References Cited

U.S. PATENT DOCUMENTS

| | | | |
|---|---|---|---|
| 5,475,626 A | * 12/1995 | Viletto | ........................ 361/680 |
| 6,073,187 A | 6/2000 | Jacobs et al. | |
| 6,101,676 A | * 8/2000 | Wahl et al. | .................... 16/342 |
| 6,137,676 A | * 10/2000 | Merkel | ........................ 361/680 |
| 6,404,623 B1 | * 6/2002 | Koshika | ..................... 361/681 |

FOREIGN PATENT DOCUMENTS

JP          8-129435          5/1996

* cited by examiner

Primary Examiner—Darren Schuberg
Assistant Examiner—Anthony Q. Edwards
(74) Attorney, Agent, or Firm—Foley & Lardner LLP (57) ABSTRACT

The electronic apparatus includes a main body having a keyboard, a display unit supported by the main body, and a sub display unit provided in the main body. The display unit can rotate between a closed position, in which the display unit covers the keyboard, and an opened position, in which the display unit exposes the keyboard. The sub display unit has a display panel which displays information, and the inclination angle of the sub display unit with the main body can be adjusted through an adjustment mechanism.

15 Claims, 5 Drawing Sheets

ELECTRONIC APPARATUS HAVING SUB DISPLAY UNIT WITH ADJUSTABLE INCLINATION ANGLE

CROSS-REFERENCE TO RELATED APPLICATIONS

This application is based upon and claims the benefit of priority from the prior Japanese Patent Application No. 2001-367247, filed Nov. 30, 2001, the entire contents of which are incorporated herein by reference.

BACKGROUND OF THE INVENTION

1. Field of the Invention

The present invention relates to an electronic apparatus, such as a portable computer comprising a sub display unit to display, for example, the receipt status of electronic mail and titles during the reproduction of sounds from compact disks ("CDs"), for example music CDs.

2. Description of the Related Art

In recent years, multifunctional portable computers in which a CD-ROM drive and a speaker box are mounted have come into widespread use. With such portable computers it is possible to enjoy high-quality sounds by outputting reproduced sound from television and CDs.

Portable computers of this type typically comprise a computer main body having a keyboard, a display unit rotatably supported by the computer main body, and a sub display unit built in the computer main body. The sub display unit has an elongated display panel. The display panel displays, for example, the receipt status of electronic mail, titles (for example, music titles) during the reproduction of sounds from CDs or application names and/or icons that are currently running or are available to be run.

A portable computer having a mini status display screen is described in U.S. Pat. No. 6,073,187. The mini status display screen displays a secondary operational mode of a computer system such as a mode for playing audio CDs in a CD-ROM drive independent of an operating system.

In the case of a portable computer, the miniaturization and weight reduction of the computer main body have been pursued for the convenience of portability. For this reason, the sub display unit is fixed to the computer main body for reasons of limited space and the display panel is exposed at the top surface of the computer main body. Therefore, the operator can see the information displayed on the display panel while operating the portable computer.

In general, a portable computer is often horizontally placed at a suitable distance from the operator of the computer so that the display unit is at a level lower than the height of the eyes of the operator. For this reason, during the use of the computer, the operator's line of sight is directed slantingly downward so that the operator can look down the computer main body.

However, in a case where, for example, a computer is operated with the computer main body placed on the top of a desk, the height of the top of the desk is diverse and, therefore, the direction of a display panel of the sub display unit with respect to the operator's line of sight changes depending on the installation height of the computer main body. Furthermore, when one portable computer is shared by several persons, the direction of the display panel differs according to the operator's body height and, in particular, sitting height.

Therefore, in a conventional portable computer having a display panel whose direction is fixedly determined, the relationship between the direction of the display panel and the operator's line of sight may become unsuitable. As a result, to see information displayed on the display panel, the operator is forced to change his or her posture so as to peer into the display panel, thus inconveniencing the operator.

BRIEF SUMMARY OF THE INVENTION

Embodiments of the invention provide an electronic apparatus which can improve the visibility of a sub display unit and enables information displayed on this sub display unit to be easily seen.

An electronic apparatus according to an embodiment of the invention comprises a main body and a display unit supported by the main body. The display unit has a relatively small display panel which may display no more than 5 lines of information, including text and symbols. The display unit may be adjusted between a range of inclination angles with respect to the main body.

According to one embodiment, the display unit is maintained at a constant angle of inclination with respect to a vertical direction by including a weight in the display unit.

According to other embodiments, an electronic apparatus comprises a surface having an opening therein and a display unit provided in the opening. The display unit has a relatively small display panel which displays no more than 5 lines of information, including text and symbols. The display unit may be adjusted between a range of inclination angles with respect to the surface.

According to still other embodiments, a portable computer comprises a computer main body having a keyboard and a display unit supported by the main body. The display unit is rotatable between a closed position, in which the display unit covers the keyboard, and an opened position, in which the display unit exposes the keyboard. The portable computer further includes a sub display unit, separate and distinct from the display unit, the sub display unit being supported by the main body and having a back surface and a front surface, the front surface having a display panel which displays information, including text and symbols. The sub display unit may be adjusted between a range of inclination angles with respect to the main body.

According to yet other embodiments, an electronic apparatus comprises a main body having a keyboard, a display unit supported by the main body and a sub display unit provided in the main body. The display unit can rotate between a closed position, in which the display unit covers the keyboard, and an opened position, in which the display unit exposes the keyboard. The sub display unit has a display panel which displays information, and the inclination angle of the sub display unit with respect to the main body can be adjusted through an adjustment mechanism.

According to this feature, the inclination angle of the sub display unit can be freely adjusted to suit the preferences of the operator. Therefore, it is possible to keep a suitable relationship between the operator's line of sight and the direction of the display panel and, therefore, the display panel is easily seen. Accordingly, the operator can see information displayed on the display panel without changing his or her direction of line of sight.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

A first embodiment of the invention will be described below with reference to FIGS. 1 to 3.

Figure 1:
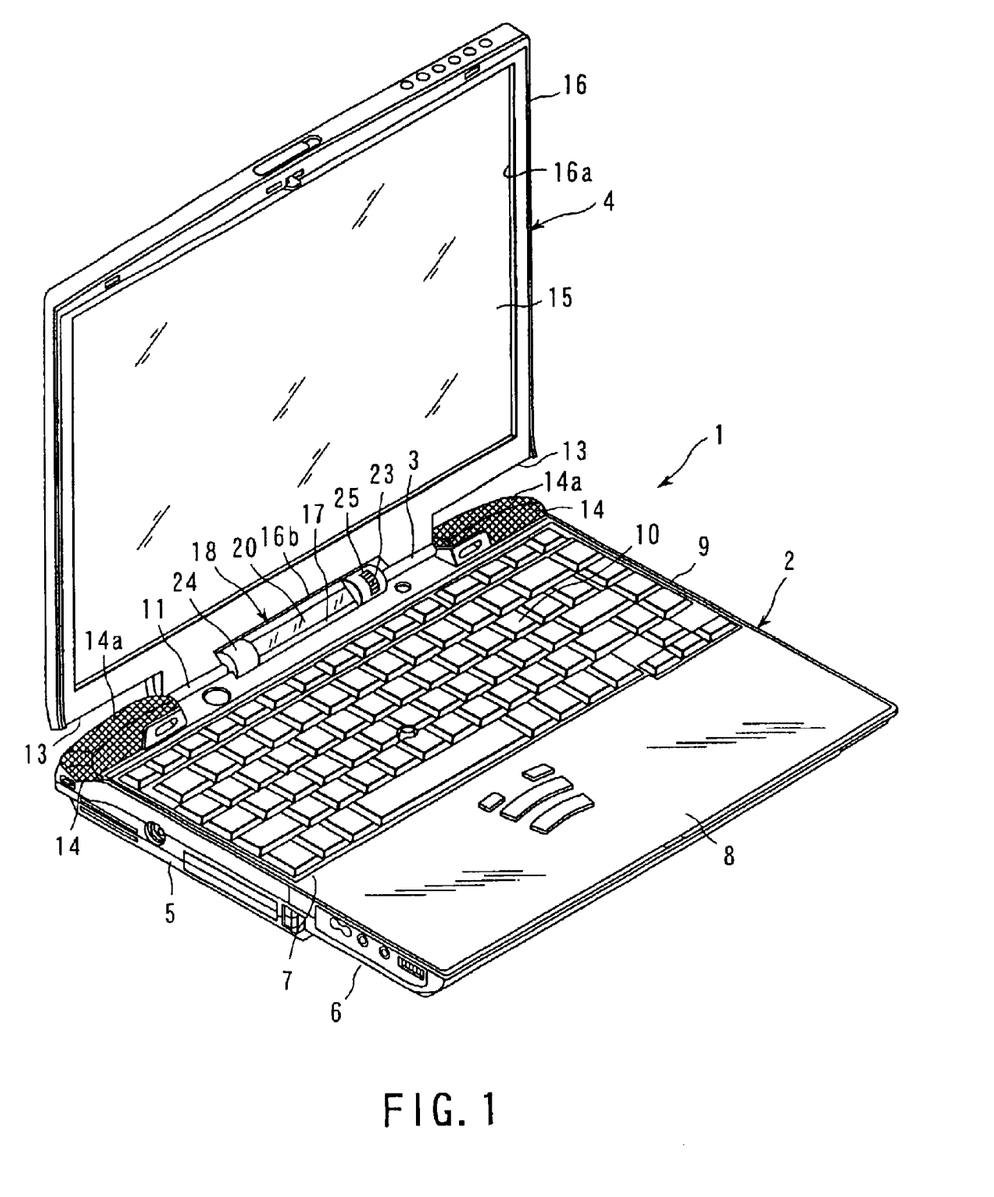
FIG. 1 is a perspective view of a portable computer in a first embodiment of the invention, with a display unit rotated to an opened position.
Figure 2:
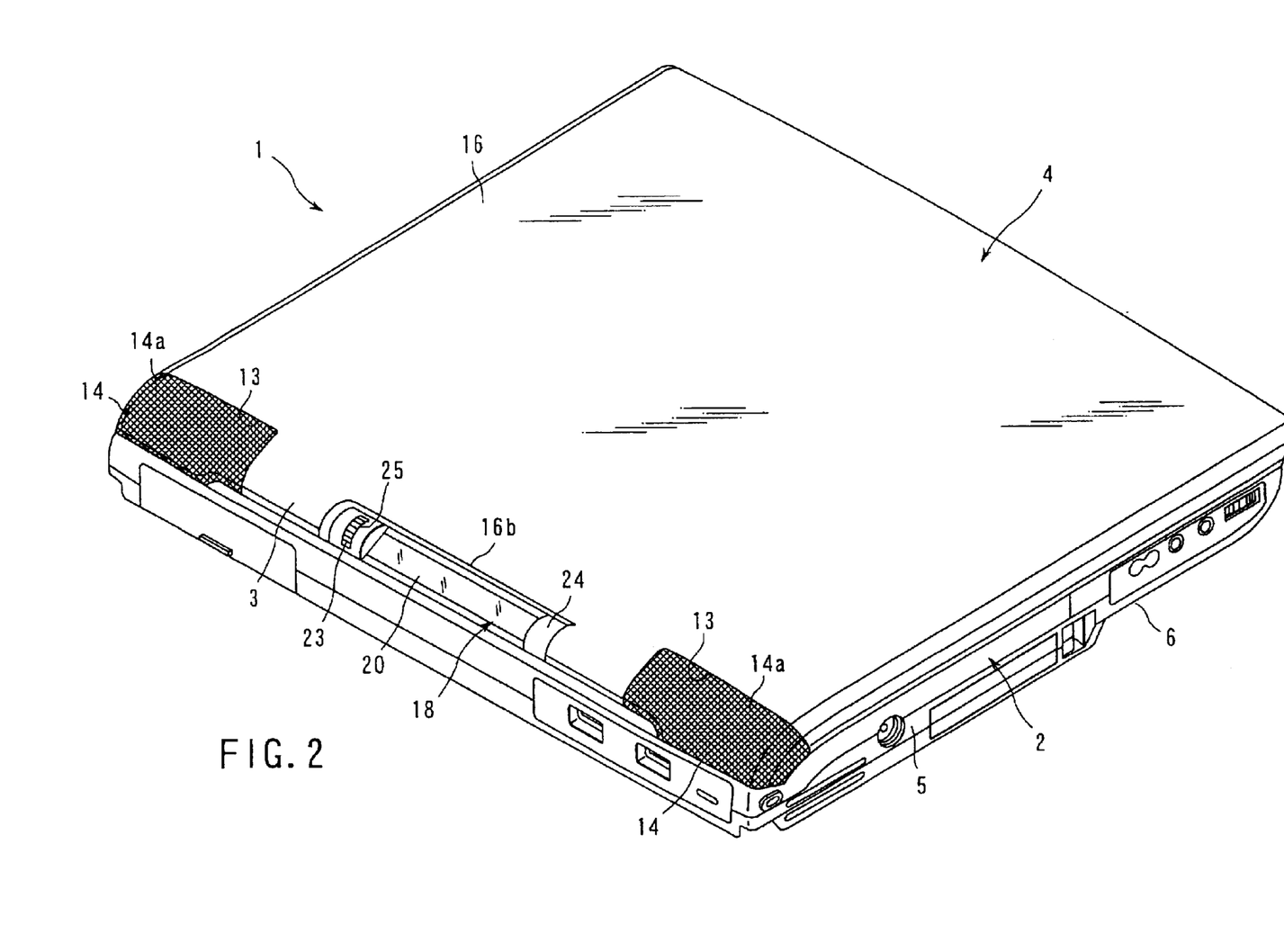
FIG. 2 is a perspective view of a portable computer in the first embodiment of the invention, with a display unit rotated to a closed position.

FIGS. 1 and 2 show a portable computer 1 as an electronic apparatus. The portable computer 1 comprises a computer main body 2 and a display unit 4 supported by the computer main body 2.

The computer main body 2 has a flat box-shaped housing 5. The housing 5 is constituted by a base 6 and a tabular cover 7 which covers the base 6 from above. The cover 7 has a palm rest 8 and a keyboard mounting portion 9. The palm rest 8 is positioned in the front half portion of the housing 5. The keyboard mounting portion 9 is positioned at the rear of the palm rest 8, and a keyboard 10 is mounted on the keyboard mounting portion 9.

The display unit 4 comprises a liquid crystal display panel 15 and a display housing 16 which houses the liquid crystal display panel 15. The liquid crystal display panel 15 is exposed to the outside through an opening 16a which opens to the front surface of the display housing 16.

The display housing 16 has, at one end portion thereof, a hinged leg 3. The hinged leg 3 is positioned in the middle portion along the longitudinal direction of the display housing 16 and protrudes therefrom toward the rear end portion of the housing 5. The front end portion of the hinged leg 3 is supported by the rear end portion of the housing 5 through a hinge shaft (not shown). For this reason, the display unit 4 can rotate between a closed position, in which the display unit 4 covers the palm rest 8 and the keyboard 10 from above, and an opened position, in which the display unit 4 exposes the palm rest 8, the keyboard 10 and the liquid crystal display panel 15.

As shown in FIGS. 1 and 2, a pair of speaker boxes 14 is disposed in the rear end portion of the housing 5. The speaker boxes 14 are spaced from each other in the longitudinal direction of the housing 5 and protrude upward from the top surface of the cover 7. Each of the speaker boxes 14 has a speaker cover 14a. The top surface of the speaker cover 14a is curved in the shape of a circular arc.

A connecting portion 11 between the hinged leg 3 of the display housing 16 and the housing 5 is positioned between the speaker boxes 14. Furthermore, the display housing 16 has a pair of relief portions 13. The relief portions 13 are symmetrically arranged with the hinged legs 3 interposed therebetween so as to avoid the speaker boxes 14. For this reason, when the display unit 4 is rotated from the closed position to the opened position or vice versa, the display housing 16 will not interfere with the speaker boxes 14.

As shown in FIG. 2, the rear surface of the hinged leg 3 is curved in the shape of a circular arc so as to follow the top surface of the speaker cover 14a. As a result, the rear surface of the hinged leg 3 provides a continuity with the top surface of the speaker cover 14a when the display unit 4 is rotated to the closed position.

As shown in FIGS. 1 and 2, the housing 5 of the computer main body 2 has a sub display mounting portion 17. The sub display mounting portion 17 has an elongated shape extending in the longitudinal direction of the housing 5. The sub display mounting portion 17 opens at the rear end portion of the cover 7 in the middle portion along the longitudinal direction of the housing 5. The opening of the sub display mounting portion 17 is positioned between the speaker boxes 14.

Furthermore, the hinged leg 3 of the display housing 16 has a notched portion 16b. The notched portion 16b has an elongated shape extending in the longitudinal direction of the display housing 16 so as to correspond to the sub display mounting portion 17. The notched portion 16b faces the sub display mounting portion 17.

A sub display unit 18 is inserted into the sub display mounting portion 17. The sub display unit 18 has a display main body 19 as shown in FIG. 3. The display main body 19 has the shape of a flat elongated box extending in the longitudinal direction of the housing 5. The display main body 19 has a front surface and a back surface. A display panel 20 is provided on the front surface thereof. The display panel 20 is provided to display information, for example the receipt status of electronic mail, titles during the reproduction of sounds from CDs and/or application names and/or icons that are currently running or are available to be run on computer 1. The display panel 20 is relatively small in comparison to the display unit 4. According to embodiments of the present invention, the display panel 20 may display no more than 5 lines of information, including text and symbols. In one embodiment, the display panel 20 displays only 1 line of information.

According to the present embodiment, the display panel 20 has the shape of a rectangle extending in the longitudinal direction of the housing 5 and part of the display panel 20 enters the notched portion 16b of the hinged leg 3. For this reason, the sub display unit 18 is positioned in the connecting portion between the hinged leg 3 of the display unit 4 and the housing 5. Furthermore, as shown in FIG. 2, the display panel 20 is exposed to the outside of the portable computer 1 through the notched portion 16b of the display housing 16 when the display unit 4 is rotated to the closed position.

Figure 3:
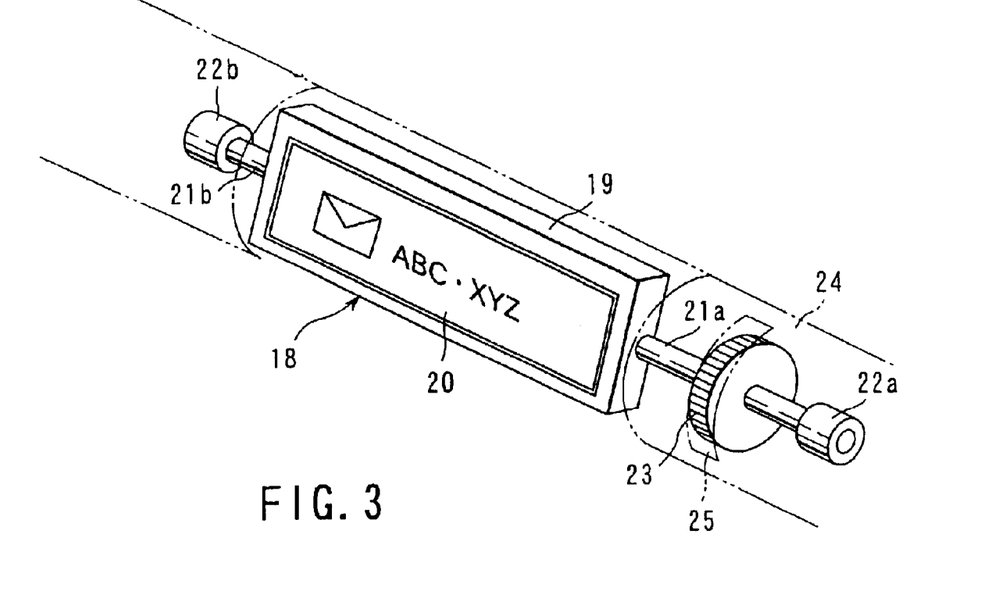
FIG. 3 is a perspective view showing the relationship between a sub display unit having a display panel and a control device in the first embodiment of the invention.

FIG. 3 shows the mounting structure of the sub display unit 18, according to embodiments of the present invention.

The sub display unit has a first rotating shaft 21a and a second rotating shaft 21b. The first rotating shaft 21a protrudes from one end portion of the display main body 19. The second rotating shaft 21b protrudes from the other end of the display main body 19. These first and second rotating shafts 21a, 21b are disposed coaxially with each other along the longitudinal direction of the housing 5.

The first and second rotating shafts 21a, 21b are rotatably supported by the housing 5 through bearings 22a, 22b, respectively. For this reason, the display panel 20 of the display main body 19 is rotatable about a longitudinal axis of the sub display mounting portion 17 at an arbitrary angle with the housing 5, i.e., the display panel 20 is rotatable between a range of inclination angles with respect to the housing 5. According to embodiments of the present invention, at least a portion of the back surface of the display main body 19 faces the housing 5 at each of the inclination angles within the range. On the first rotating shaft 21a is attached a disciform control device 23 that constitutes an angle adjustment mechanism. In one embodiment, the control device 23 is adjacent to the display panel 20 and can rotate integrally with the first rotating shaft 21a.

The first and second rotating shafts 21a, 21b and the bearings 22a, 22b are covered with a cover 24. The cover 24 is exposed at the display mounting portion 17 and notched portion 16b. The cover 24 has a slit-like window 25. The window 25 is formed in a position corresponding to the control device 23. Part of the outer peripheral surface of the control device 23 is exposed to the outside through the window 25 and is configured in such a manner that fingertips can be pressed against the outer peripheral surface of the control device 23. Therefore, when the control device 23 is manipulated by finger tips, the display main body 19 rotates on the first and second rotating shafts 21a, 21b. By this rotation the inclination angle of the display panel 20 changes freely.

In the portable computer 1 of such a construction as described above, when the display unit 4 is rotated to the opened position, the keyboard 10 and the display panel 20 of the sub display unit 18 are exposed as shown in FIG. 1. Therefore, the operator can see information displayed on the display panel 20 while manipulating the keyboard 10.

If the relationship between the operator's line of sight and the direction of the display panel 20 is not suitable, information displayed on the display panel 20 may become difficult to see, for example, due to the reflection of light on the display panel 20.

In such a case, the operator manipulates the control device 23 with his or her fingertips and causes the display main body 19 to rotate on the rotating shafts 21a, 21b. Therefore, the inclination angle (direction) of the display panel 20 changes. As a result, it is possible to freely adjust the direction of the display panel 20 so that it may be most easily seen by the operator. Hence, the operator can easily see information displayed on the display panel 20 without changing his or her line of sight. At the same time, the operator needs not change his or her posture so as to peer into the display panel 20. Thus the operator is not forced to assume an unnatural posture during the operation of the computer 1.

Furthermore, according to the above construction, the operator may sometimes listen to music by use of the portable computer 1 with the display unit 4 kept closed. In this case, the display main body 19 of the sub display unit 18 is in the notched portion 16b of the display housing 16 and, therefore, as shown in FIG. 2, when the display unit 4 is rotated to the closed position, the display panel 20 and control device 23 become exposed to the outside through the notched portion 16b.

Therefore, by manipulating the control device 23 with fingertips, the display main body 19 is rotated and the direction of the display panel 20 can be freely changed. Hence, the operator can easily see music titles displayed on the display panel 20 without changing his or her line of sight.

Furthermore, in a case where the operator listens to music while carrying the computer with him or her, the operator may sometimes close the display unit 4 and hold the portable computer 1 by putting his or her hand on the front end portion of the housing 5. In this case, the portable computer 1 is caused to assume a standing posture with the sub display unit 18 facing upward. Therefore, the display panel 20 of the display main body 19 and the control device 23 become exposed through the notched portion 16b. As a result, as with the foregoing, the inclination angle of the display panel 20 can be freely adjusted by manipulating the control device 23 with fingertips so that information displayed on the display panel 20 can be easily seen.

In addition, even in a case where the operator operates the portable computer 1 that is placed on his or her lap, the inclination angle of the display panel 20 of the sub display unit 18 can be freely adjusted by manipulating the control device 23 with fingertips. Therefore, the direction of this display panel 20 can be freely adjusted so that information displayed on the display panel 20 is easily seen.

Figure 4:
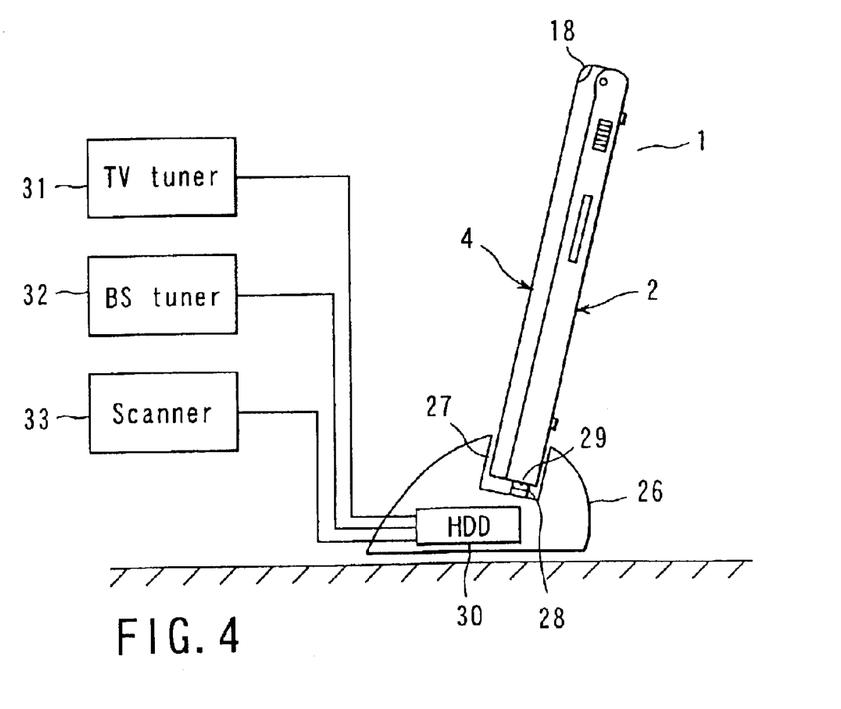
FIG. 4 is a side view of a portable computer connected to a docking station in a second embodiment of the invention.

The present invention is not limited to the above first embodiment. FIG. 4 shows a second embodiment of the invention.

The second embodiment shows a portable computer 1 connected to a docking station 26 as an expansion apparatus. The docking station 26 has a concave portion 27 which opens upward. The concave portion 27 serves to hold the portable computer 1 in an upright condition. This concave portion 27 has a bottom on which a connector receptacle 28 is arranged.

The portable computer 1 is removably inserted into the concave portion 27 with the display unit 4 kept closed and with the front end portion of the housing 5 kept in a downward posture. The portable computer 1 has a connector 29 in the front end portion of the housing 5. The connector 29 becomes electrically connected to the connector receptacle 28 when the portable computer 1 is inserted into the concave portion 27.

The docking station 26 houses a hard disk drive (HDD) 30. The hard disk drive 30 is electrically connected to a TV tuner 31, a broadcast satellite ("BS") tuner 32 and a scanner 33. The hard disk drive 30 stores information sent from the TV tuner 31, BS tuner 32 and scanner 33. Information stored in the hard disk drive 30 is read by the portable computer 1.

According to such a construction, the portable computer 1 is caused to assume a standing posture with the sub display unit 18 facing upward. As a result, as with the above first embodiment, the display panel 20 of the display main body 19 and the control device 23 become exposed through the notched portion 16b and information displayed on the display panel 20 can be seen. Besides, the inclination angle of the display panel 20 can be freely adjusted by manipulating the control device 23 with fingertips so that information displayed on the display panel 20 can be easily seen. Therefore, the operator can see indications on the display panel 20 without changing the direction of his or her line of sight.

Figure 5:
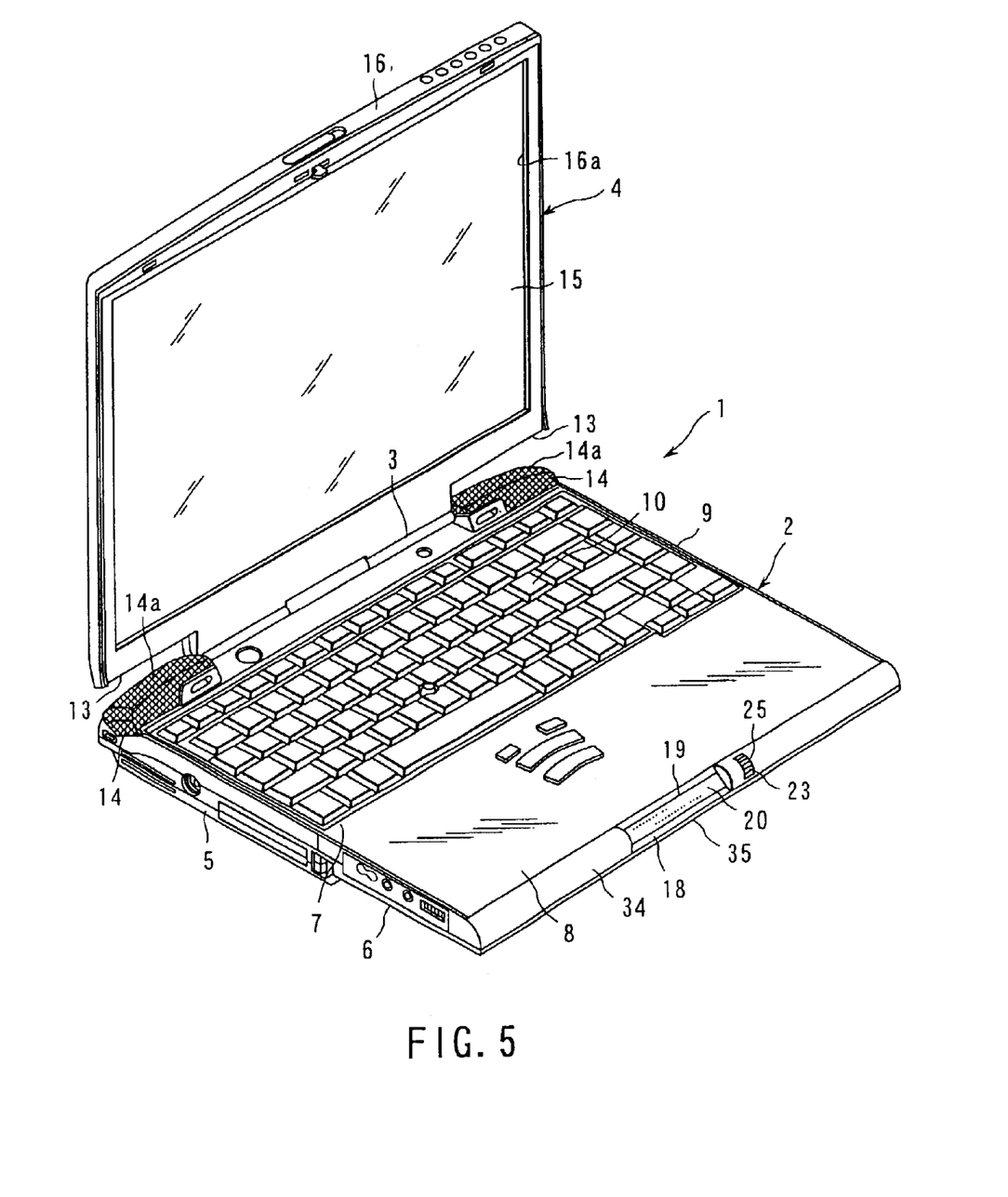
FIG. 5 is a perspective view of a portable computer in a third embodiment of the invention, with a display unit rotated to an opened position.

FIG. 5 shows a third embodiment of the invention.

This third embodiment differs from the above first embodiment in the position of the sub display unit 18. The basic construction of the portable computer 1 other than this point is the same as the above first embodiment. Therefore, in the third embodiment, the same reference numerals as in the first embodiment are given to the same component parts as in the first embodiment, and descriptions of such component parts are omitted.

As shown in FIG. 5, the housing 5 has an extension 34 in the front end portion thereof. The extension 34 extends in the longitudinal direction of the housing 5 is and stretches from the front end of the palm rest 8 to before the housing 5. Even when the display unit 4 is rotated to the closed position, the extension 34 is exposed to the outside of the portable computer 1 without being covered by the display unit 4.

The extension 34 has a sub display mounting portion 35. The sub display mounting portion 35 is positioned in the middle portion of the housing 5 along the longitudinal direction thereof and opens to above and before the housing 5. The sub display unit 18 is rotatably inserted into the sub display mounting portion 35. The display panel 20 of the sub display unit 18 is exposed to outside the housing 5 through the sub display mounting portion 35 whether the display unit 4 is rotated to the closed position or the opened position.

Moreover, part of the outer peripheral surface of the control device 23 to rotate the sub display unit 18 is exposed to the outside through a window 25 opened to the extension 34. The window 25 is adjacent to the sub display mounting portion 35.

According to this construction, the sub display unit 18 positioned in the front end portion of the housing 5 is kept in a condition exposed to the outside of the portable computer 1 whether the display unit 4 is rotated to the closed position or the opened position. Therefore, information displayed on the display panel 20 can be seen in various modes of use, for example, a case where the operator manipulates a keyboard 10 with the portable computer 1 placed on a desk or a case where sounds are reproduced from a CD with the display unit 4 kept closed.

Furthermore, the inclination angle of the display panel 20 can be freely adjusted by manipulating a control device 23 exposed in the extension 34 of the housing 5 with fingertips so that information displayed on the display panel 20 can be easily seen. Therefore, the operator can see indications on the display panel 20 without changing the direction of his or her line of sight.

According to embodiments of the present invention, the position of the sub display unit 18 is not limited to the connecting portion between the rear end portion of the housing 5 and the display unit 4 or the front end portion of the housing 5. For example, the sub display unit 18 may be provided in the right or left side portion of the housing 5.

Furthermore, as in the above third embodiment, in the case where the sub display unit 18 is provided in the front end portion of the housing 5, a connector 29 to be connected to a docking station 26 may be arranged in the rear end portion of the housing 5. According to this construction, the portable computer 1 is held in a standing posture with the sub display unit 18 facing upward. Therefore, the operator can see information displayed on the display panel 20.

According to the above first and third embodiments, the display main body 19 of the sub display unit 18 is manually rotated. However, the present invention is not limited to this driving method and, for example, the display main body 19 may be driven by a stepping motor. In this case, the inclination angle of the display main body 19 may be regulated in stages by manipulating the keyboard to cause the stepping motor to be rotated by one pitch each.

Moreover, an inclination angle at which the operator can most easily look at the indication panel 20 may be set beforehand and this inclination angle may be stored along with a password determined by the operator. If this practice is adopted, the inclination angle of the display panel 20 of the display main body 19 may be automatically determined simultaneously with the start of the portable computer 1.

Figure 6:
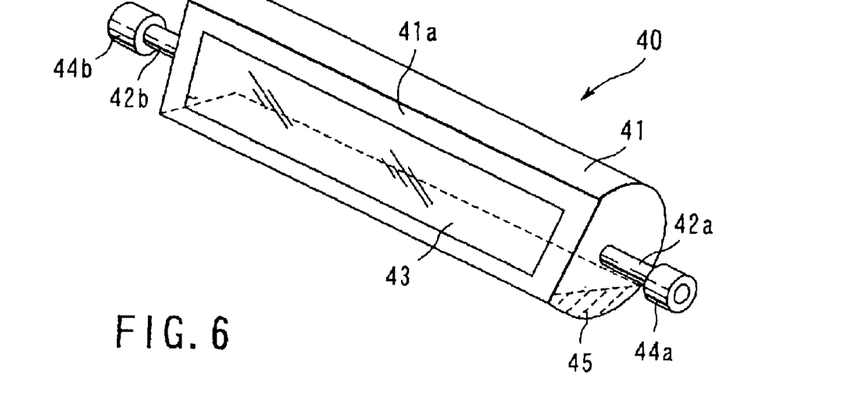
FIG. 6 is a perspective view of a sub display unit having a weight in a fourth embodiment of the invention.
Figure 7:
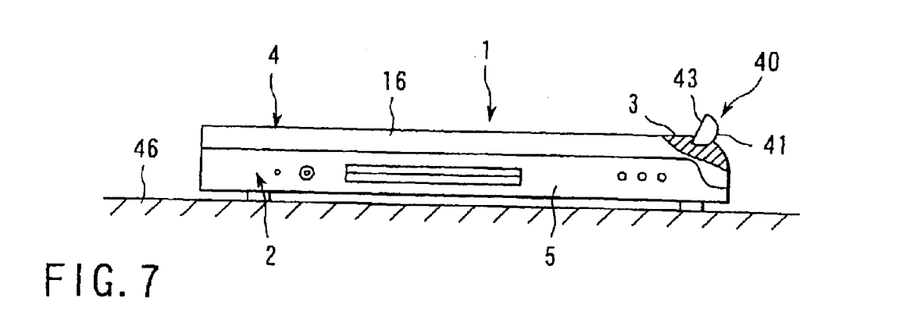
FIG. 7 is a side view of a sub display unit in the fourth embodiment of the invention, with a computer main body of the computer horizontally placed.
Figure 8:
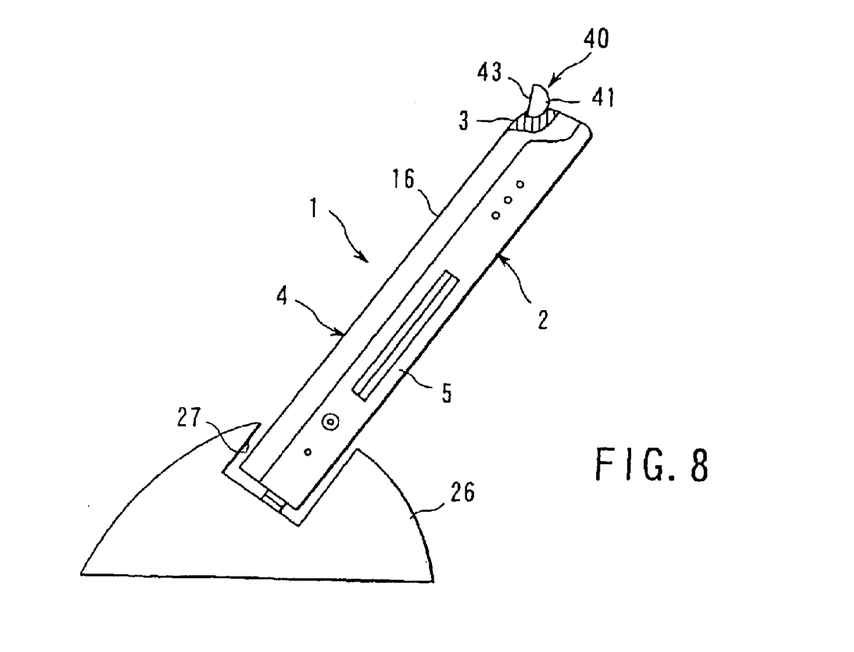
FIG. 8 is a side view of a sub display unit in an inclined position in the fourth embodiment of the invention, with the portable computer connected to a docking station.

FIGS. 6 to 8 show a fourth embodiment of the invention.

A sub display unit 40 of this fourth embodiment includes a cylindrical display main body 41, a first rotating shaft 42a, and a second rotating shaft 42b. The display main body 41 has a flat surface 41a in a front part of the outer external surface thereof. The remaining part of the display main body 41 is referred to herein as the back part or surface. The flat surface 41a extends in the axial direction of the display main body 41. A rectangular display panel 43 is provided on the flat surface 41a. The display panel 43 serves to display, for example, the receipt status of electronic mail, titles during the reproduction of sounds from CDs and/or application names and/or icons that are currently running or are available to be run on computer 1.

The first rotating shaft 42a protrudes from one end portion of the display main body 41. The second rotating shaft 42b protrudes from the other end portion of the display main body 41. These first and second rotating shafts 42a, 42b are coaxially disposed with each other. The first and second rotating shafts 42a, 42b are rotatably supported by the hinged leg 3 of the display housing 16 through bearings 44a, 44b, respectively. Therefore, the display panel 43 of the display main body 41 is rotatable at an arbitrary inclination angle with the display housing 16, i.e., the display panel 43 is rotatable between a range of inclination angles with respect to the display housing 16. According to embodiments of the present invention, at least a portion of the back surface of the display main body 41 faces the display housing 16 at each of the inclination angles within the range.

As shown in FIG. 6, a weight 45 made of, for example, metal is attached to the bottom end portion of the display main body 41. By use of its own weight, the weight 45 limits free movement of the display main body 41. Therefore, the display panel 43 of the display main body 41 is maintained in a posture inclined so as to be constantly at a predetermined angle with respect to a vertical direction. The predetermined angle points the display panel 43 toward the operator.

FIG. 7 shows a case where the portable computer 1 is placed on a horizontal surface 46 such as a top of a desk. In this case, by the weight of the weight 45, the display main body 41 rotates on the first and second rotating shafts 42a, 42b and is held in a certain posture with the display panel 43 pointed toward the operator.

FIG. 8 shows how the portable computer 1 is inserted into the concave portion 27 of the docking station 26 in a standing posture. In this case, the display main body 41 rotates automatically by the weight of the weight 45 according to a change in the posture of the portable computer 1 and is held in a certain posture with the display panel 43 constantly pointed toward the operator.

According to such a construction, the display main body 41 rotates automatically according to a change in the posture of the portable computer 1. For this reason, whatever posture the portable computer 1 may assume, the display panel 43 is held in an inclined posture so as to constantly point toward the operator. Therefore, the operator can easily see information displayed on the display panel 43. Furthermore, the operator needs not manually adjust the inclination angle of the display main body 41, resulting in improved usability.

The electronic apparatus according to embodiments of the present invention is not limited to a portable computer and can be applied to other information processing units.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    a main body; and
    a display unit supported by said main body, said display unit having a relatively small display panel which displays no more than 5 lines of information, including text and symbols, said display unit being moveable within a range of inclination angles with respect to said main body,
    wherein said display unit has a weight positioned in said display unit for keeping the inclination angle of said display unit constant with respect to a vertical direction.

2. The electronic apparatus according to claim 1, wherein said display panel displays only 1 line of information.

3. An electronic apparatus comprising:
    a surface having an opening therein;
    a display unit provided in said opening, said display unit having a relatively small display panel which displays no more than 5 lines of information, including text and symbols, said display unit being adjustable within a range of inclination angles with respect to said surface; and
    an adjustment mechanism, including a stepping motor, for adjusting said display unit within said range of inclination angles.

4. The electronic apparatus according to claim 3, wherein said display unit comprises first and second rotating shafts disposed coaxially with each other along a longitudinal axis of said opening for rotatably supporting said display unit, and said display unit is adjustable to a vicinity of the longitudinal axis of said opening with the first and second rotating shafts as a center.

5. The electronic apparatus according to claim 3, wherein said adjustment mechanism comprises a disciform adjustment mechanism.

6. An electronic apparatus comprising:
    a main body having a keyboard;
    a display unit supported by said main body, said display unit being capable of rotating between a closed position, in which said display unit covers said keyboard, and an opened position, in which said display unit exposes said keyboard; and
    a sub display unit provided in said main body, said sub display unit having a display panel which displays information and a weight which tilts said display panel at a predetermined angle with respect to a vertical direction.

7. An electronic apparatus comprising:
    a main body having a keyboard and a rear end portion located behind the keyboard;
    a display unit having a hinged leg supported by the rear end portion of the main body, the display unit being capable of rotating between a closed position, in which the display unit covers the keyboard, and an opened position, in which the display unit exposes the keyboard;
    a sub display unit located in a connecting portion between the hinged leg and the main body, the sub display unit having a display panel which displays information, and being exposed outside the main body even when the display unit is rotated to the closed position; and
    an adjustment mechanism to adjust an inclination angle of the sub display unit with respect to the main body, the adjustment mechanism having a control device exposed at the connecting portion, the control device being exposed outside the display unit and capable of adjusting the inclination angle of the sub display unit even when the display unit is rotated to the closed position.

8. The electronic apparatus according to claim 7, wherein the sub display unit has a back surface, and is adjustable within a range of inclination angles with respect to the main body wherein at least a portion of the back surface faces the main body.

9. The electronic apparatus according to claim 7, wherein the display panel displays no more than 5 lines of information.

10. The electronic apparatus according to claim 7, wherein the display panel displays only 1 line of information.

11. An electronic apparatus comprising:
    a main body having a rear end portion, a front end portion and a keyboard, the front end portion being positioned on an opposite side with respect to the rear end portion with the keyboard interposed therebetween;
    a display unit supported by the rear end portion of the main body, the display unit being capable of rotating between a closed position, in which the display unit covers the keyboard, and an opened position, in which the display unit exposes the keyboard;
    a sub display unit provided in the front end portion of the main body, the sub display unit having a display panel which displays information, the display panel being exposed outside the main body even when the display unit is rotated to the closed position; and
    an adjustment mechanism to adjust an inclination angle of the sub display unit with respect to the main body, the adjustment mechanism being exposed at the front end portion and capable of adjusting the inclination angle of the sub display unit even when the display unit is rotated to the closed position.

12. The electronic apparatus according to claim 11, wherein the main body has an extension at the front end portion, the extension is exposed outside the main body even when the display unit is rotated to the closed position or the opened position, and the extension has a mounting portion for rotatably supporting the sub display unit.

13. The electronic apparatus according to claim 11, wherein the sub display unit has a back surface, and is adjustable within a range of inclination angles with respect to the main body wherein at least a portion of the back surface faces the main body.

14. The electronic apparatus according to claim 11, wherein the display panel displays no more than 5 lines of information.

15. The electronic apparatus according to claim 11, wherein the display panel displays only 1 line of information.

* * * * *